United States Patent [19]

Smith et al.

[11] 3,963,744

[45] June 15, 1976

[54] SILICONE-COMPATIBLE PHTHALOCYANINE DYESTUFFS

[75] Inventors: Carl Mayn Smith, Sun City, Ariz.; George V. D. Tiers, St. Paul, Minn.

[73] Assignee: Minnesota Mining and Manufacturing Company, St. Paul, Minn.

[22] Filed: Aug. 8, 1975

[21] Appl. No.: 604,651

Related U.S. Application Data

[60] Continuation-in-part of Ser. No. 501,265, Aug. 28, 1974, abandoned, which is a division of Ser. No. 275,190, July 26, 1972, Pat. No. 3,888,891.

[52] U.S. Cl. .............................. 260/314.5; 8/1 XA; 8/8
[51] Int. Cl.² ......................................... C09B 47/02
[58] Field of Search .................................. 260/314.5

[56] References Cited
OTHER PUBLICATIONS

Sudo et al., Chem. Abst., vol. 79, Item 20414 (1973).

*Primary Examiner*—Harry I. Moatz
*Attorney, Agent, or Firm*—Alexander, Sell, Steldt & DeLaHunt

[57] ABSTRACT

Phthalocyanine dyestuffs containing the tris(trimethylsilyloxy)silylalkylamino group,

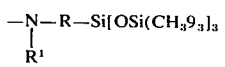

where $R^1$ is H or lower alkyl are produced and are found to be compatible with cured silicone polymers.

1 Claim, No Drawings

SILICONE-COMPATIBLE PHTHALOCYANINE DYESTUFFS

This application is a continuation-in-part of our application Ser. No. 501,265, filed Aug. 28, 1974, now abandoned which was a division of our application Ser. No. 275,190, filed July 26, 1972, now U.S. Pat. No. 3,888,891.

This invention relates to silicone-containing phthalocyanine dyestuffs that are compatible with silicone polymers and to the process for preparing the same. More particularly, the invention is concerned with phthalocyanine dyestuffs containing the tris(trimethylsilyloxy)silylalkylamino group,

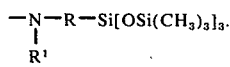

Silicone polymers have been used for many years in a variety of applications because of their stability to a wide range of environmental conditions including high and low temperatures, solvents and water and their excellent electrical characteristics. The polymers may be pigmented but have not been dyed because no readily available dyes have been found that are compatible with them. The present invention is based on the discovery of a class of hydrolytically stable, readily available dyes containing a high percentage of silicon that are compatible with silicone polymers.

A limited range of dyestuffs containing silicon are disclosed in the art. Such dyestuffs are generally prepared by the reaction of an aminoalkyl silane such as, for example, 3-aminopropyltriethoxysilane with suitable dye intermediates. Thus, Bailey and Pike in a series of U.S. Pat. Nos. 2,955,898; 2,955,899 and 2,963,338, teach the preparation of silicon-containing thiazine dyes, silicon-containing triarylmethane dyes and silicon-containing azo triazine dyes, respectively, by the reaction of a corresponding dyestuff intermediate with an aminoalkyl silane. The preparation of azo dyes containing an aminoalkyl silyl group is taught in U.S. Pat. Nos. 2,929,313; 2,927,839; 2,931,693 and 2,957,744 also issued to Bailey and Pike. These may or may not be polymerized to a polysiloxane. Hemzawi and Jones, J. Soc. Dyers and Colourists 85 (9), 401 (1969), describe the preparation of anthraquinone dyes containing aminoalkyl silane groups such as 3-aminopropyltriethoxysilane groups. None of the silicone-containing dyes disclosed in the foregoing references are compatible with cured silicone resins. Many are soluble in organic solvents, e.g., heptane, and low molecular weight silanes, but, when solutions of the silane containing the silicon-containing dyes are cured, syneresis forces the dye from the silicone so that completely undyed cured silicone resins are obtained.

Andrianov et al., J. Organometallic Chemistry 12, 63(1968) describes dyes prepared by diazotizing an aminoarylethylheptamethyl cyclotetrasiloxane and coupling the diazotized compound with a coupling agent. The aminoarylethylheptamethyl cyclotetrasiloxane is obtained by reduction of nitroarylethylheptamethyl cyclotetrasiloxane which in turn is obtained by condensation of nitrostyrene with heptamethyl cyclotetrasiloxane. According to Sokolov, Zhur. Obshchei Khim. 29, 248(1959); Chem. Abs. 53, 21621f (1959), heptamethyl cyclotetrasiloxane is obtained along with many other silanes by the co-hydrolysis of dichlorodimethylsilane and dichloromethylhydrosilane. The preparation of azo dyestuffs having an ethylheptamethyl cyclotetrasilane is therefore an involved and costly process. The compatibility of these dyestuffs with silicones may be conjectured.

It is an object of this invention to provide silicon-containing phthalocyanine dyestuffs that are compatible with cross-linked silicones.

It is another object to provide silicon-containing phthalocyanine dyestuffs that may be synthesized in good yields by a relatively simple process.

Other objects of the invention will in part be obvious and will in part appear hereinafter.

The dyestuffs of this invention are dyestuufs valuable in being compatible with cross-linked silicone polymers. They are structurally characterized by having, for each two aromatic rings within the dye molecule, at least one tris(trimethylsiloxy)silylalkyl group having the formula:

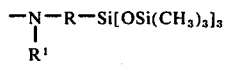

wherein R is a straight or branched chain lower alkylene group having 1 to 6 carbon atoms and $R^1$ is hydrogen or lower alkyl group having 1 to 6 carbon atoms. A linking sulfonyl group is employed for convenience in synthesis. The dyes of the invention are phthalocyanines with at least three tris(trimethylsiloxy)silylalkyl sulfonyl groups as represented by formulae II in which $R^2$ is H or tris(trimethylsiloxy)-silylalkyl

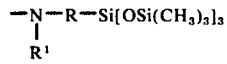

wherein R and $R^1$ are as defined above.

The dyes of the invention have the formulae:

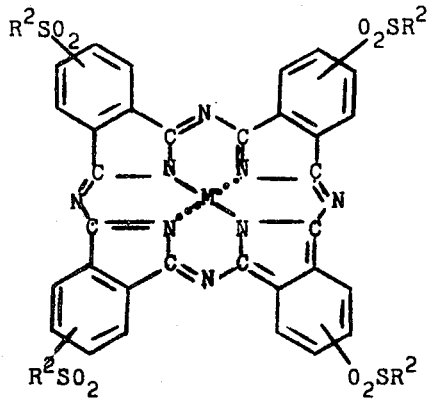

II

The dyestuffs of this invention are prepared by the reaction of a tris(trimethylsiloxy)silylalkyl amine having the formula:

-continued

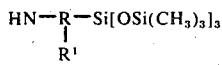

wherein R and R¹ are as defined above and M is a metal of the group of copper, nickel or cobalt, with a halosulfonyl phthalocyanine.

Suitable tris(trimethylsiloxy)silylalkyl amines for use in the preparation of the dyestuufs of the invention include the following:

3-tris(trimethylsiloxy)silylpropylamine
N-methyl-3-tris(trimethylsiloxy)silylpropylamine
N-ethyl-3-tris(trimethylsiloxy)silylpropylamine
N-propyl-3-tris(trimethylsiloxy)silylpropylamine
N-isopropyl-3-tris(trimethylsiloxy)silylpropylamine
N-butyl-3-tris(trimethylsiloxy)silylpropylamine
2-tris(trimethylsiloxy)silylethylamine
N-methyl-2-tris(trimethylsiloxy)silylethylamine
N-ethyl-2-tris(trimethylsiloxy)silylethylamine
N-butyl-2-tris(trimethylsiloxy)silylethylamine
4-tris(trimethylsiloxy)silylbutylamine
N-methyl-4-tris(trimethylsiloxy)silylbutylamine
N-methyl-3-tris(trimethylsiloxy)silylbutylamine
N-ethyl-2-tris(trimethylsiloxy)silylbutylamine The tris(trimethylsilyloxy)silylalkylamines are prepared by the reaction of bis(trimethylsilyl)oxides with trialkoxysilylalkylamines in the presence of an alkaline catalyst such as, for example, quaternary ammonium hydroxides, e.g., tetraalkylammonium hydroxides, e.g., tetramethylammonium hydroxide. The reaction proceeds according to the following equation:

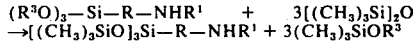

wherein R and R¹ are as hereinbefore defined and R³ is lower alkyl, i.e., methyl or ethyl. The reaction takes place between about 50° and 200°C. and preferably between about 100° and 150°C. In a preferred method of preparing tris(trimethylsilyloxy)silylalkylamines, one mole of triethoxysilylalkylamine is heated with 3 moles of bis(trimethylsilyl)oxide and about 0.02 moles of tetramethyl ammonium hydroxide (20% in methanol) in an apparatus equipped for vacuum distillation through an efficient fractionating column. The pot is heated to and maintained at about 135° to 140° whereupon methanol and trimethylethoxysilane distills over at between 64° and 99° C. The tris(trimethylsilyloxy)-silylalkylamine is isolated from the pot residue generally by vacuum distillation.

Chromogenic compounds as referred to herein are compounds commonly used in the art as dyestuffs or as intermediates for the preparation of dyestuffs. The compounds possess a sufficient number and configuration of unsaturated groups, e.g., C=O, COOH, N=O, NO₂, N=N, C=C, C ≡ C, C=S, etc., to afford selective absorption of light of wavelengths between about 350 to 700 millimicrons and thereby include compounds absorbing ultraviolet light as well as visible light. The chromogenic compounds useful in the preparation of the dyestuffs of the invention may be any chromogenic compound (dyestuff or dyestuff intermediate) that has an atom or group of atoms susceptible to displacement by or addition of the reactive group of the tris(trimethylsiloxy)silylalkylamine. Particularly useful chromogenic compounds include halosulfonyl derivatives of dyestuffs.

Halosulfonyl derivatives of dyestuffs suitable for use in the preparation of dyestuffs of the invention are compounds having the general formula:

wherein D represents the residue of a chromogenic compound excluding $n$ replaceable hydrogen atoms, $n$ is an integer having a value from 1 to 6 or more, and X is halogen with atomic weight below about 36 and is preferably chlorine. In particular, D is a phthalocyanine metal complex.

Typical halosulfonyl derivatives of dyestuffs are those halosulfonyl derivatives that are made by halosulfonating dyestuffs so that at least one halosulfonyl group is introduced into the dyestuff molecule for every two aromatic rings and, preferably one for each aromatic ring, without destroying the dyestuff. Halosulfonation to this extent is most feasible with amino or hydroxyl group-containing dyestuffs. Typical halosulfonyl derivatives of dyestuffs that may be used include the sulfonyl halide derivatives of copper phthalocyanine, nickel phthalocyanine, and cobalt phthalocyanine, such as i.e., copper 3,3',3'',3'''-phthalocyaninetetrasulfonylchloride.

The halosulfonyl derivatives of dyestuffs are generally most conveniently prepared by heating the dyestuff in chlorosulfonic acid by conventional procedures. Because the presence of dyestuff sulfonic acid in the reaction product makes the isolation of the dyestuff sulfonylhalide difficult, it is advantageous to convert any sulfonic acid to the sulfonyl chloride by heating the chlorosulfonic acid reaction mixture with thionylchloride (as described, for example, in U.S. Pat. No. 3,057,873) before isolation of the dyestuff sulfonylchloride. The reaction of dyestuff and chlorosulfonic acid may be carried out at about 75° to 150° and preferably 110° to 150° C. for 1 to about 12 hours and preferably about 3 to 5 hours. Generally, the higher the temperature, the shorter the time required to effect reaction. Temperatures higher than 150° up to 175° may be used in closed pressurized systems. Chlorosulfonation is carried out using from about 5 to about 20 parts and preferably about 10 to about 15 parts by weight of chlorosulfonic acid per part of dyestuff. The reaction with thionylchloride may be carried out at 30° to 80° C. for about 6 to 48 hours and preferably at 70° to 80° C. for about 10 to 12 hours. The reaction with thionylchloride is carried out, also in parts by weight, using about 0.5 to 5 parts and preferably 1 to 2 parts of thionyl chloride per part of dyestuff initially used.

The silicon-containing dyestuffs of the invention are prepared from the desired dyestuff sulfonylhalide by reaction of one molar equivalent of dyestuff sulfonylhalide with $n$ molar equivalents of tris(trimethylsilyloxy)-silylalkylamine in the presence of an acid receptor. In this instance $n$ is the number of sulfonyl halide groups per molecule. The process is basically that which is well known in the art for the preparation of amides by the reaction of sulfonylhalides with amines. The acid receptor may be an alkali metal carbonate such as sodium carbonate or an alkali metal hydroxide such as sodium hydroxide. The acid receptor may be excess tris(trimethylsilyloxy)silylalkylamine, however, it is preferred that the acid receptor be a tertiary amine such as, for example, pyridine. At least $n$ molar equivalents of acid receptor is used, however, 1.5 $n$ to 10 $n$ molar equivalents or more may be used. The reaction generally takes place by mixing the components of the reaction together using excess acid receptor to provide fluidity to the mixture, however, where the acid receptor is an alkali metal carbonate or hydrate sufficient water (1 to about 5 times the total weight of the other reactants) to produce a readily stirred mixture is used. The reaction mixture is stirred and heated at about 25° to 50° C. for 3 to 24 hours to effect reaction, charged into about an equal volume of water, filtered, washed with water and dried.

Dyestuffs of the invention are useful for incorporation into silicone polymers and are compatible therewith, that is, the dyestuffs are not expelled from the polymer when it is crosslinked. An illustrative example of a cyan dyestuff of the invention is:

0.01% to about 5% and preferably from about 0.5 to 2% by weight whereon; in the absence of fillers, clear transparent colored polymers are obtained. A particularly useful application of the dyestuffs of the invention is to impart color to silicone polymers that are used to provide release layers such as are used in pressure sensitive tapes. Release liner papers, films or other surfaces may be coated with a solution containing about 3 to 10% curable silicone polymer and about 0.5 to about 2% of a silicon polymercompatible dyestuff of the invention, the coating dried, and allowed to cure. The presence or lack of uniformity in the coating thickness is readily detected by observing either by eye or by instrument any variations in color density.

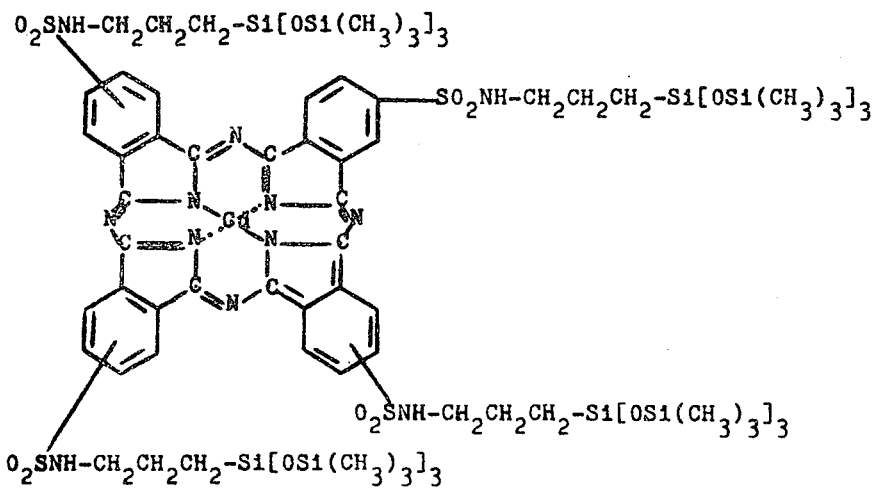

Useful silicone polymers which may be crosslinked generally and remain compatible with the dyestuffs of the invention may be selected from a broad family of silicone products including silicone polymers crosslinkable by heating with organic peroxides, e.g., silicone polymers having 0.02 to 0.5 mole-percent of methylvinylsiloxane units; and α, ω-difunctional silicone polymers which may be crosslinked by using polyfunctional crosslinking agents, e.g., hydroxy-terminated polysiloxanes, commonly called "silanol-stopped fluids", crosslinked with polyfunctional crosslinking agents, e.g., methyltrichlorosilane or with certain catalysts with esters of orthosilicic, esters of polysilicic acid, alkyltrialkoxysilanes, and silanes with Si-H bonds. Other suitable difunctional silicone polymers are the diacetoxy-terminated polydimethylsiloxanes and —Si—O—N=C< terminated polydimethylsiloxanes such as acetone oxime-terminated polydimethylsiloxanes having the terminal group

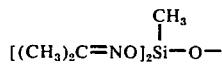

which are crosslinkable by moisture.

The dyestuffs of the invention are useful to impart color to silicone polymers that are molded and cured to resins, for example, as moldings and gaskets. The moldings and gaskets maintain the imparted color and do not expel the dyestuff. The color may be for decorative purposes or for coding purposes. Concentrations of the dyestuff in the silicone polymer may range from about The silicone polymers into which the silicone polymer-compatible dyestuffs of the invention may be incorporated may also contain fillers and pigments including calcium carbonate, titanium dioxide, zinc oxide, clay, quartz flour, glass fibers, metal fibers, and the like.

The following examples are illustrative of the invention and the preparation of cross-linked silicone-compatible tris(trimethylsilyloxy)silylalkylaminosulfonyl dyestuffs, but are not intended in any way to limit the scope thereof.

Example 1

A 1-liter 3-neck flask fitted with mechanical stirrer, thermometer, and condenser with drying tube is charged with 49.3 g. copper phthalocyaninetetrasulfonylchloride salt mixture containing 49.3% copper phthalocyaninetetrasulfonylchloride (0.025 moles) (prepared as described hereinbelow)
200 ml. dry pyridine, and
38 g. 3-tris(trimethylsilyloxy)silylpropylamine (0.107 moles) (prepared as described hereinbelow).

The mixture is heated to 60°C. and held at 57° to 60° C. for 4 hours. The mixture is transferred to a stripping flask and the volatiles removed by heating to 60° to 65° C. at a pressure of 1 mm. The concentrate is taken up in heptane (about 500 ml.) and washed repeatedly with aqueous sodium chloride solution (5 parts of saturated aqueous sodium chloride and 1 part of water) to remove pyridine hydrochloride. A few drops of 40% sodium hydroxide is useful in breaking emulsions that may form. The washed heptane solution is dried over anhydrous sodium sulfate, filtered and the heptane removed by heating under vacuum (0.5 mm). There is obtained 56 g. of blue-black coarse flaky powder. (Theoretical is 55 g.)

Calculated for $C_{80}H_{148}N_{12}O_{20}Si_{16}S_4$: Cu, 2.8%, Si, 20.1; S, 5.17% Found: Cu, 2.6%; Si, 18.5; S, 5.3%.

Similar dyestuffs are obtained when cobalt or nickel phthalocyaninetetrasulfonylchloride is used in place of copper phthalocyaninetetrasulfonylchloride in equivalent amounts.

Metal phthalocyaninetetrasulfonylchlorides are prepared as exemplified by the following description of the preparation of copper phthalocyaninetetrasulfonylchloride. A 1-liter 4-neck flask fitted with mechanical stirrer, thermometer, drying tube, and solids addition flask for introduction of solids into the flask without allowing atmospheric moisture to enter is charged with 375 ml. of chlorosulfonic acid and the solids addition flask with 50 g. of Monastral Fast Blue BC (Trade Name for copper phthalocyanine) (Color Index 74160). The flask contents are stirred and the copper phthalocyanine is added over one-half hour during which time the temperature rises to 55°C. The mixture is heated to 140°C. during 1 hour and held at this temperature for 4 additional hours, then allowed to cool. The solids addition flask is replaced by a dropping funnel and at 80° C. 31 ml. of thionylchloride is added dropwise over a period of 2 hours. The mixture is cooled to about 20° C. and drowned in ice-salt mixture. The solid is collected and washed with saturated salt solution until the filtrate tests free from sulfate ion. After drying in vacuo over anhydrous calcium chloride, there is obtained 95.8 g. of product containing 49.3% copper phthalocyaninetetrasulfonylchloride by analysis.

Tris(trimethylsiloxy)silylpropylamine is prepared by charging a Todd still with 17.7 parts of 3-trimethoxysilylpropylamine (available from Union Carbide Corporation under the trade code name "A1100"), 88.8 parts bis(trimethylsilyl)oxide (available from Dow Corning Corporation under the trade code name DC200), and 1 part of a 20% solution of tetramethylammonium hydroxide. The still pot is heated to 137° C. and set to maintain this temperature. At a reflux ratio of 50 to 1, 22.7 parts of distillate is removed in about 16 hours, the head temperature rising from 64° to 99° C. There is then added 1 part of Cab-O-Sil to the still pot (to neutralize the tetramethylammonium hydroxide) and the distillation continued at about 1 mm. pressure and a reflux ratio of 5 to 1, collecting the fraction boiling 72° to 76° C. Water in an amount equivalent to the methoxy groups present in the distillate (as determined by chromatographic absorption) (approximately 1.5 parts) is added to the distillate and the mixture refluxed for 12 hours. The refluxed material is then subjected to fractional distillation and the portion boiling 74° to 78° C. at 0.95 mm collected. There is obtained 11.2 parts of tris(trimethylsiloxy)silylpropylamine having a purity of 96% by chromatographic absorption, a density of 0.891 g./ml. at 25°C., and a refractive index at 25°C. of 1.4117.

Other tris(trimethylsiloxy)silylalkyl amines of the formula:

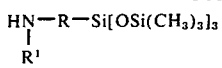

-continued

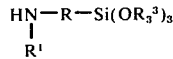

wherein R and $R^1$ are as previously defined may be prepared by replacing 3-trimethoxysilylpropylamine in the above procedure with a corresponding amine of the formula:

$$HN-R-Si(OR_3{}^3)_3$$
$$|$$
$$R^1$$

Thus, when 3-trimethoxysilylpropylamine is replaced in the above procedure by N-methyl-3-trimethoxysilylpropylamine (b.p. 204°C., and refractive index at 25°C. of 1.4196, obtained by the reaction of methylamine and γ-chloropropyltrimethoxysilane (available from General Electric Co. under the trade name SC-3732)) there is obtained N-methyl-3-tris(trimethylsilyloxy)-silylpropylamine having a boiling point of 77°–80° at 0.9 mm. pressure.

Example 2

To 100 parts of a hydroxy-terminated polydimethylsiloxane, believed to have a molecular weight of about 30,000 to 50,000, (available commercially under the designation L-9000 from Union Carbide Corp.) is added 1 part of the tris(trimethylsiloxy)silylpropylamino substituted phthalocyanine dye prepared as described above and 0.2 parts of stannous octoate. The mixture is stirred to dissolve the components. There is added 3 parts of tetraethyl silicate to the solution and the solution cast as a film. The film cures with the elimination of ethanol to a transparent deep blue cross-linked silicon polymer film. Even after prolonged aging of the film, dye is not expelled from the film.

Example 3

A one liter, three neck flask fitted with mechanical stirrer, thermometer, and condensor with drying tube is charged with:
  20.0 g copper phthalocyaninetetrasulfonylchloride salt mixture (as used in Example 1) (0.01 moles),
  18.0 g N-methyl-3-tris(trimethylsilyloxy)silylpropylamine (0.048 moles) (prepared as described above), and
  100 ml dry pyridine.

The mixture is heated at reflux for three hours, the condenser then replaced by a vacuum distilling head and the volatiles removed by heating the flask contents to 65°C. at a pressure of 1mm. The concentrate is taken up in heptane and washed with aqueous sodium chloride, dried over anhydrous sodium sulfate, filtered and the heptane removed as described in Example 1. Tetra-N-methyl-tris(trimethylsiloxy)silylpropylaminosulfonyl copper phthalocyanine is obtained as a flaky powder. It is blue-black and compatible with crosslinked silicone polymers, providing these polymers with a clear, transparent cyan color that is not expelled from the polymer.

What is claimed is:
1. A metal phthalocyanine of the formula:

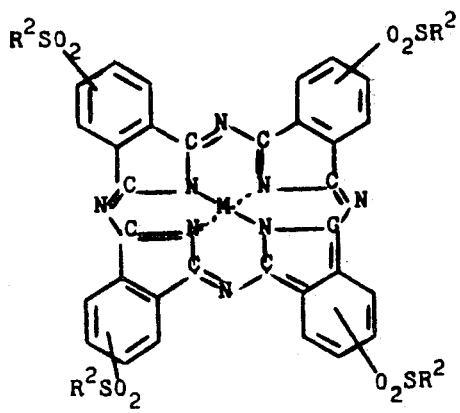
wherein M is a metal of the group of copper, nickel or cobalt and $R^2$ is tris(trimethylsilyloxy)silylalkylamino
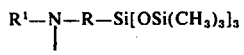
in which R is straight or branched chain unsubstituted alkylene of 1–6 carbon atoms and $R^1$ is hydrogen or unsubstituted lower alkyl or 1 to 6 carbon atoms.
* * * * *